United States Patent
Fava et al.

(10) Patent No.: US 12,531,734 B2
(45) Date of Patent: *Jan. 20, 2026

(54) CERTIFYING AUTHENTICITY OF STORED CODE AND CODE UPDATES

(71) Applicant: Micron Technology, Inc., Boise, ID (US)

(72) Inventors: Salvatore Fava, Francofonte (IT); Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 718 days.

This patent is subject to a terminal disclaimer.

(21) Appl. No.: 17/173,518

(22) Filed: Feb. 11, 2021

(65) Prior Publication Data

US 2021/0167960 A1 Jun. 3, 2021

Related U.S. Application Data

(63) Continuation of application No. 15/879,787, filed on Jan. 25, 2018, now Pat. No. 10,924,277.

(51) Int. Cl.
*H04L 9/32* (2006.01)
*G06F 8/65* (2018.01)
(Continued)

(52) U.S. Cl.
CPC .................. *H04L 9/32* (2013.01); *G06F 8/65* (2013.01); *G06F 9/4401* (2013.01); *H04L 9/0838* (2013.01); *H04L 9/0891* (2013.01); *H04L 9/0894* (2013.01); *H04L 9/3234* (2013.01); *H04L 9/3242* (2013.01); *H04L 9/3247* (2013.01)

(58) Field of Classification Search
CPC ....... H04L 9/32; H04L 9/0838; H04L 9/0891; H04L 9/0894; H04L 9/3234; H04L 9/3242; H04L 9/3247; G06F 8/65; G06F 9/4401
See application file for complete search history.

(56) References Cited

U.S. PATENT DOCUMENTS

| | | | |
|---|---|---|---|
| 6,388,558 B1 | 5/2002 | Emmei | |
| 7,917,888 B2 * | 3/2011 | Chong | G06F 8/20 717/102 |

(Continued)

OTHER PUBLICATIONS

Emmanuel Owusu, et al.: "OASIS: on achieving a sanctuary for integrity and secrecy on untrusted platforms", CCS'13 Proceedings of the 2013 ACM SIGSAC conference on Computer & communications security, Nov. 8, 2013. See sections 4, 6.2.

(Continued)

*Primary Examiner* — Yonas A Bayou
(74) *Attorney, Agent, or Firm* — Greenberg Traurig

(57) ABSTRACT

The authenticity and/or integrity of data is determined based on cryptographic measurements. In some cases, the data is executable code of a computer program stored in system memory. In other cases, the data is firmware stored in a storage device or a boot device. In yet other cases, the data is executable code that is part of an update being received by an application controller. For example, the update may be a secure over-the-air (SOTA) update of software stored in firmware (e.g., on a storage device or a boot device).

15 Claims, 7 Drawing Sheets

(51) Int. Cl.
*G06F 9/4401* (2018.01)
*H04L 9/08* (2006.01)

(56) References Cited

U.S. PATENT DOCUMENTS

| | | | |
|---|---|---|---|
| 7,934,049 B2 | 4/2011 | Holtzman et al. | |
| 8,068,614 B2 | 11/2011 | Kumar et al. | |
| 9,049,005 B2 | 6/2015 | Cho et al. | |
| 9,489,540 B2 | 11/2016 | Lee et al. | |
| 9,563,774 B1 | 2/2017 | Litvin | |
| 9,858,208 B2 | 1/2018 | Connolly et al. | |
| 10,310,505 B1* | 6/2019 | Hanson | G05D 1/0274 |
| 10,332,124 B2* | 6/2019 | Avary | H04W 4/70 |
| 10,715,321 B2* | 7/2020 | Mondello | H04L 9/3242 |
| 10,778,661 B2* | 9/2020 | Mondello | H04L 9/12 |
| 10,924,277 B2 | 2/2021 | Fava et al. | |
| 2003/0033175 A1 | 2/2003 | Ogura et al. | |
| 2004/0249663 A1 | 12/2004 | Shishido | |
| 2007/0300207 A1* | 12/2007 | Booth | G06F 21/575 |
| | | | 717/124 |
| 2008/0148061 A1 | 6/2008 | Jin et al. | |
| 2009/0222672 A1 | 9/2009 | Clarke et al. | |
| 2010/0228997 A1 | 9/2010 | Cheng et al. | |
| 2010/0241841 A1 | 9/2010 | Buer | |
| 2010/0313056 A1 | 12/2010 | Margolis et al. | |
| 2011/0191837 A1 | 8/2011 | Guajardo Merchan et al. | |
| 2012/0042376 A1 | 2/2012 | Dolgunov et al. | |
| 2012/0313796 A1 | 12/2012 | Lee et al. | |
| 2013/0047144 A1 | 2/2013 | Chalmers et al. | |
| 2013/0185548 A1 | 7/2013 | Djabarov et al. | |
| 2013/0279689 A1 | 10/2013 | Obaidi | |
| 2014/0032933 A1 | 1/2014 | Smith et al. | |
| 2014/0108786 A1 | 4/2014 | Kreft | |
| 2014/0195100 A1 | 7/2014 | Lundsgaard et al. | |
| 2014/0230061 A1 | 8/2014 | Higbee et al. | |
| 2014/0240089 A1 | 8/2014 | Chang | |
| 2015/0012737 A1 | 1/2015 | Newell | |
| 2015/0038090 A1 | 2/2015 | Chang | |
| 2015/0092939 A1 | 4/2015 | Gotze et al. | |
| 2015/0348179 A1 | 12/2015 | Kamisawa | |
| 2016/0055068 A1* | 2/2016 | Jeansonne | G06F 21/572 |
| | | | 714/15 |
| 2016/0062361 A1 | 3/2016 | Nakano et al. | |
| 2016/0128016 A1 | 5/2016 | Avary et al. | |
| 2016/0357963 A1 | 12/2016 | Sherman | |
| 2017/0017808 A1 | 1/2017 | Kwong et al. | |
| 2017/0109533 A1 | 4/2017 | Shah et al. | |
| 2017/0126414 A1 | 5/2017 | Goel et al. | |
| 2017/0235957 A1 | 8/2017 | Maletsky | |
| 2018/0157259 A1 | 6/2018 | Myslinski | |
| 2018/0234498 A1* | 8/2018 | Sangameswaran | H04L 12/18 |
| 2018/0373598 A1 | 12/2018 | Mondello et al. | |
| 2019/0068361 A1* | 2/2019 | Ye | H04W 4/48 |
| 2019/0174514 A1 | 6/2019 | Ramesh et al. | |
| 2019/0199525 A1* | 6/2019 | Mondello | H04L 9/3242 |
| 2019/0202399 A1* | 7/2019 | Troia | H04W 12/06 |
| 2019/0221139 A1* | 7/2019 | Schrijen | H04L 9/0866 |
| 2019/0229913 A1 | 7/2019 | Fava et al. | |
| 2019/0316921 A1* | 10/2019 | Osawa | G08G 1/00 |
| 2019/0334882 A1* | 10/2019 | Mondello | G06F 21/78 |
| 2019/0372964 A1* | 12/2019 | Newton | G06F 21/31 |

OTHER PUBLICATIONS

International Search Report and Written Opinion, PCT/US2018/063641, mailed Jun. 27, 2019.

International Search Report and Written Opinion, PCT/US2018/063143, mailed Mar. 12, 2019.

International Search Report and Written Opinion, PCT/US2018/068132, mailed May 1, 2019.

International Search Report and Written Opinion, PCT/US2019/028303, mailed Aug. 6, 2019.

* cited by examiner

Look-Up Table (LUT) 160

| Starting Address | Ending Address | Digest |
|---|---|---|
| xxx1 | yyy1 | zz1 |
| xxx2 | yyy2 | zz2 |
| xxx3 | yyy3 | zz3 |
| ... | ... | ... |

FIG. 3

CERTIFYING AUTHENTICITY OF STORED CODE AND CODE UPDATES

RELATED APPLICATIONS

The present application is a continuation application of U.S. patent application Ser. No. 15/879,787, filed Jan. 25, 2018, issued as U.S. Pat. No. 10,924,277 on Feb. 16, 2021, and entitled "Certifying Authenticity of Stored Code and Code Updates," the disclosure of which application is hereby incorporated by reference herein in its entirety.

FIELD OF THE TECHNOLOGY

At least some embodiments disclosed herein relate to determining authenticity of data (e.g., stored computer programs or executable code, or secure over-the-air (SOTA) code updates for the foregoing) in general, and more particularly, but not limited to, determining whether to accept or reject data (e.g., stored data or a data update) based on comparing a cryptographic measurement of the data to an expected value (e.g., a digest of stored code or a code update).

BACKGROUND

A cryptographic hash function is a class of hash function that has properties making it suitable for use in cryptography. It maps data of arbitrary size to a bit string of a fixed size (a hash) and is designed to be a one-way function (e.g., a function which is infeasible to invert). The only way to re-create the input data from the output of a cryptographic hash function is to attempt a brute-force search of possible inputs to see if they produce a match. The input data is often called the message, and the output (the hash value or hash) is often called the message digest or simply the digest.

Cryptographic hash functions have many information-security applications, notably in digital signatures, message authentication codes (MACs), and other forms of authentication. They can also be used as ordinary hash functions, to index data in hash tables, for fingerprinting, to detect duplicate data or uniquely identify files, and as checksums to detect accidental data corruption.

In one example, a MAC is a short piece of information used to authenticate a message. The MAC is used to confirm that the message came from the stated sender or source (e.g., to determine that the message is authentic) and has not been altered in an unauthorized manner. The MAC output value (e.g., the digest) protects the message's data integrity as well as its authenticity, by allowing verifiers (e.g., who possess the secret key used by the sender to calculate the MAC output value) to detect any changes to the message content.

BRIEF DESCRIPTION OF THE DRAWINGS

The embodiments are illustrated by way of example and not limitation in the figures of the accompanying drawings in which like references indicate similar elements.

FIG. 3 shows an exemplary lookup table containing a plurality of digests, each digest corresponding to a starting and ending address, according to one embodiment.

DETAILED DESCRIPTION

Figure 1:
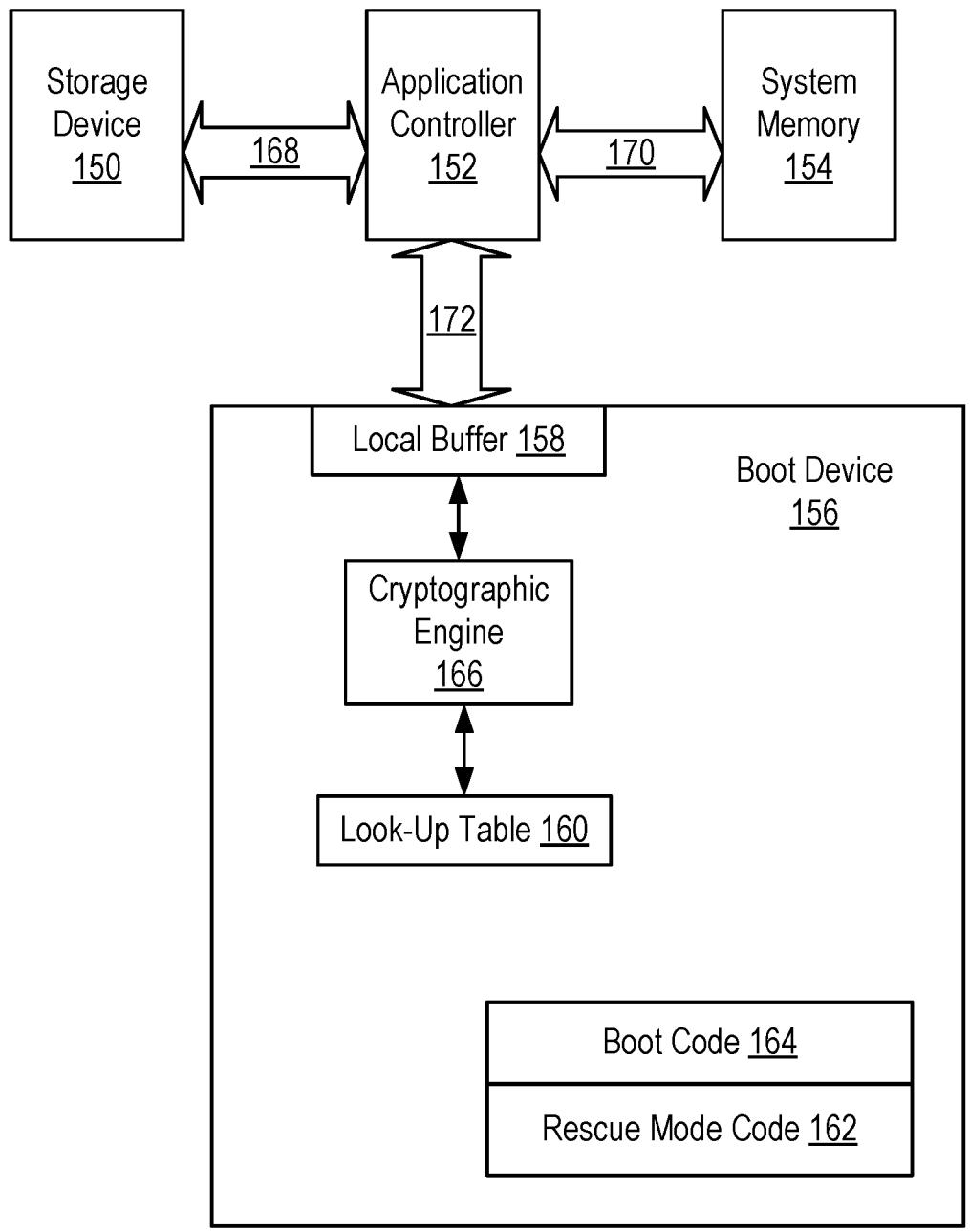
FIG. 1 shows a system for determining whether to accept or reject data (e.g., data stored in a local buffer of a boot device) based on comparing a cryptographic measurement of the data to an expected value stored in a look-up table, according to one embodiment.

At least some embodiments disclosed herein provide systems and methods for determining the authenticity and/or integrity of data. In some embodiments, the data is executable code of a computer program stored in system memory. In other embodiments, the data is firmware stored in a storage device or a boot device. In yet other embodiments, the data is executable code that is part of an update being received by an application controller. For example, the update may be a secure over-the-air (SOTA) update of software that is used to update executable code stored in system memory and/or update firmware of the application controller and/or a peripheral computing device (e.g., a storage device).

One aspect of the present embodiments includes the realization that memory is typically the main target of hacker attacks. A hacker attack is an event that indicates and/or creates a potentially dangerous or otherwise threatening situation (e.g., malware introduced into an autonomous vehicle could cause the vehicle to crash and/or cause injury to persons or property). The failure to detect such hacking may prevent taking protective or other measures that are appropriate for this type of situation. The present embodiments solve this problem by determining a cryptographic measurement for each of several portions of stored or received data and using the cryptographic measurements to determine whether the data is authentic. In response to this determination, the data can be, for example, accepted or rejected.

If the data is accepted, then the application controller can proceed to use the data. For example, the application controller can proceed to execute software code that includes the data.

In another example, the data is firmware that is executed during a boot process. If the data is accepted, then the application controller completes the boot process and begins normal operation (e.g., this normal operation can include execution of one or more computer programs stored in system memory). In one example, the authenticity and/or integrity of each of these computer programs can be tested based on comparing cryptographic measurements of portions of each computer program to respective expected values stored in a look-up table, as described further below.

If the data is rejected, then the application controller can avoid using the data. In some embodiments, the application controller can, for example, enter a rescue mode in which the application controller reboots and/or issues a new request for an update of software. In some examples, the update of software is used to replace software that was previously-stored in system memory of the application controller. In one example, the previously-stored software is erased from system memory and new software is written to the system memory based on the newly-received update.

Another aspect of the present embodiments includes the realization that security is desirable for numerous types of computing devices, including devices used in Internet of things (IoT) and autonomous vehicle implementations. A typical computing platform includes one or more components equipped with volatile and/or non-volatile memory that contain run-time code and permanent code (e.g., firmware).

In one embodiment, it is desired that all devices or components of a platform have a mechanism to ensure that an unauthorized change is recognized and fixed (e.g., using updated code coming from an authentic source). The failure to detect an unauthorized change may lead to a dangerous or destructive unauthorized function or operation of one or more of the components. The present embodiments solve this problem by determining a cryptographic measurement for each of several portions of stored or received data (e.g., run-time code or firmware stored in a component of the platform) and using the cryptographic measurements to determine whether the data has been altered in an unauthorized way. In response to this determination, the data can be, for example, accepted or rejected (e.g., similarly as described above). In some embodiments, a cryptographic memory (e.g., a look-up table) is used to measure the content stored on one or more devices.

In some cases, a system-on-chip mechanism may help in securing content of one or more memories. However, in some cases, the system-on-chip operation is improved by authenticating data stored in a storage device that is accessed during operation of the system-on-chip. In other cases, operation of a hypervisor or virtual machine is improved by ensuring the data sent to memory devices is secured and authentic.

In some cases, a platform configuration is implemented without a hardware security module. During the boot, code is moved from a boot device and a storage device to an application controller. The application controller moves the code into system memory. For example, the content stored in the system memory is obtained by unpacking the code removed from the boot device. This unpacking is performed by the application controller.

After booting, the application controller starts to operate. However, it is realized that the boot code or run-time code may present a security risk. For example, memory of the boot device contains firmware. Firmware digests can be modified or replaced by using a replay attack (communications among devices are not authenticated). As another example, in case of a boot device replacement, the system can become vulnerable because digest values are hacked, thus making the whole system vulnerable. In another example, in a secure over-the-air update, there may be no certified source of firmware.

In other cases, a platform configuration is implemented with a hardware security module (HSM) in the application controller. During the boot process, code is moved from the boot device in the storage device to the application controller. The HSM checks integrity of the code and, if the content is determined to be secure, the code is moved inside the system memory (e.g., the code is written to the system memory by the application controller). Then, the application controller starts to operate, using the HSM to validate subsequent code modifications in the system memory, and/or in the boot or storage memories (e.g., memories in one or more storage devices). However, it is realized that this architecture may have similar boot code and run-time code security risks as were discussed for the platform configuration without the HSM above.

In order to improve the above platform configurations, various embodiments described herein use comparison of cryptographic measurements of stored data to expected values and can be implemented in various different types of systems and platforms (e.g., IoT devices, or autonomous vehicles or other autonomous systems such as drones). In one embodiment, a boot code security check is performed using a component with a cryptographic engine. In another embodiment, a security check is performed for run-time code using a component with a cryptographic engine. In yet another embodiment, a secure over-the-air (SOTA) update is performed using a component with a cryptographic engine. In some embodiments, these security checks may be performed by a single computing device (e.g., a single chip).

Various embodiments using comparison of a cryptographic measurement of stored data to an expected value may provide one or more of the benefits described in the examples below when implementing a secure architecture (e.g., in some cases, a peer architecture can be implemented using only memory with HSM features). For example, a cryptographic engine of the boot device may guarantee security of information of an entire system. The other memories in the system do not need a cryptographic engine.

In another example, an over-the-air update is downloaded and verified locally in the hardware of an application before being accepted. This update permits identifying the developer of the system. The update can also implement an anti-replay mechanism.

In another example, the system can be configured to run a rescue mode to ask for a new release of firmware. The rescue mode may be entered, for example, in response to rejecting data based on a comparison to a cryptographic measurement of the data, as described below.

In another example, a hardware system can be implemented to ensure that all usage phases of the system are run using signed software. Also, integrity of volatile memory can be protected against on-the-fly code manipulation (e.g., by an unauthorized hacker).

FIG. 1 shows a system for determining whether to accept or reject data (e.g., data stored in a local buffer 158 of a boot device 156) based on comparing a cryptographic measurement of the data to an expected value stored in a look-up table 160, according to one embodiment. The data stored in the local buffer 158 is received by the boot device 156, for example, from system memory 154 or storage device 150. In one example, the data is firmware read from storage device 150 during a boot of an application controller 152.

In one example, local buffer 158 is a cache memory, typically volatile, used to store temporary data. For instance, when a portion of data is sent to a device, it is stored into a cache buffer to allow, for example, an internal finite state machine to execute a proper command off-line.

Boot device 156 may contain boot code 164, which can be executed by boot device 156 and/or loaded to application controller 152 during a boot process. For example, this boot process is performed prior to comparing cryptographic measurements to expected values for run-time code during normal operation.

If comparison of a cryptographic measurement of data results in a rejection of the data, then application controller 152 can be forced into a rescue mode. Rescue mode code 162 may be used to execute at least a portion of the rescue mode. Rescue mode code 162 may be executed by boot device 156 and/or application controller 152 during the rescue mode.

Various types of applications can be controlled and/or supported by application controller 152. Examples of such applications include a cluster, an entertainment or infotainment system, a seat control of vehicle, and a powertrain system of a vehicle.

In one embodiment, a cryptographic engine 166 determines a cryptographic measurement of the data stored in local buffer 158. Cryptographic engine 166 compares this measurement to an expected value. For example, the expected value may be stored in look-up table 160. Cryptographic engine 166 determines, based on this comparison, whether to accept or reject the data. In response to this determination, various actions can be performed, such as for example described below. In one example, cryptographic engine 166 include one or more processors and memory located on boot device 156.

Data may be transferred between components of the system via interconnects 168, 170, 172, each of which may be, for example, an internal or external data or other bus (e.g., Peripheral Component Interconnect (PCI), PCI eXtended (PCI-X), PCI Express (PCIe)), a communication portion, and/or a computer network.

In one embodiment, one or more of storage device 150, application controller 152, and system memory 154 are portions of a system-on-chip (SOC) device (e.g., all of these components are on the same SOC chip). In one embodiment, boot device 156 may be included as part of the SOC chip. In other embodiments, each of these components may be implemented on separate chips (e.g., mounted on and connected by wiring on a hardware card or other structure).

In one example, application controller 152 is the main MCU running a system (e.g., INTEL corei7 is an application controller of a computer). Various controllers (e.g., memory controller) in the surrounding system serve application controller 152 to execute functions.

In one embodiment, firmware or run-time code is received, via application controller 152, by local buffer 158 from storage device 150 or system memory 154. The determination is made to reject the data based on a cryptographic measurement of the stored data in local buffer 158. In response to determining to reject the data, application controller 152 updates at least a portion of data in the system memory 154.

For example, the data updated may be a software program that includes the rejected data. The determination to reject the data may be communicated from cryptographic engine 166 to application controller 152. In one embodiment, security of firmware or run-time code is checked by determining a cryptographic measurement for each of several portions of data. In one example, each portion is a page of data in the stored firmware or run-time code.

For example, a page of data can be received into local buffer 158 and a cryptographic measurement performed as each page of run-time code is received. Each page has a corresponding expected value stored in look-up table 160.

In one example, a page has a size of at least 4-20K bytes. In another example, the page has a size that is a minimum amount of memory that can be addressed in a system using a command.

As each page is received by boot device 156, the cryptographic measurement for the page is compared to this expected value. If the measurement matches the expected value, the page is considered to be accepted. If the measurement does not match the expected value, the page is rejected. In one example, if any page of firmware or run-time code is rejected, then the entire firmware or run-time code content is deemed defective or insecure. In such a case, the firmware or run-time code is, for example, updated by a secure over-the-air update.

In another embodiment, run-time code is stored in system memory 154. The run-time code is received as pages of data by local buffer 158, under control of application controller 152. The cryptographic measurement is made for each page of data. If all pages are accepted, then application controller 152 proceeds to execute the run-time code.

In one embodiment, the cryptographic measurement is determined by calculating a digest using a message authentication code (MAC). For example, the data to be measured and a secret key are inputs for calculating the digest. The secret key can be, for example, stored in memory of boot device 156. The calculated digest is compared to an expected value stored in a lookup table (e.g., lookup table 160, such as described with reference to FIG. 3 below). In other embodiments, the lookup table can be stored in memory of application controller 152, system memory 154, and/or other memory in the system.

In various examples, the MAC is a mechanism/algorithm to generate a signature. The calculation is based on a secret key. One example of an algorithm behind the MAC is SHA256 (which is not based on a secret key) or HMAC-SHA256 (which is based on a secret key). In modern cryptography, the MAC algorithm itself is not secret (the algorithm is a standard one). Only the key, if present, is secret. The result of the MAC calculus is sometimes known as: DIGEST, HASH, SIGNATURE, MEASURE, etc. The output of the MAC algorithm in this application is typically referred to as a "digest". The MAC is a one-way function. HASH=MAC (Key, Information). Knowing the HASH does not enable one to infer anything about the KEY or Information.

In one embodiment, firmware or other code is received from storage device 150 and copied page by page into local buffer 158. In response to determining to accept all pages of the code, application controller 152 writes the code into system memory 154. In one embodiment, as each page of a computer program is accepted based on the comparison of the cryptographic measurement to the expected value for the respective page, the accepted page is written to system memory 154 prior to receiving other pages of the computer program into local buffer 158. In other words, accepted pages can be written to system memory 154 even if there are remaining pages of a computer program to be checked.

Figure 2:
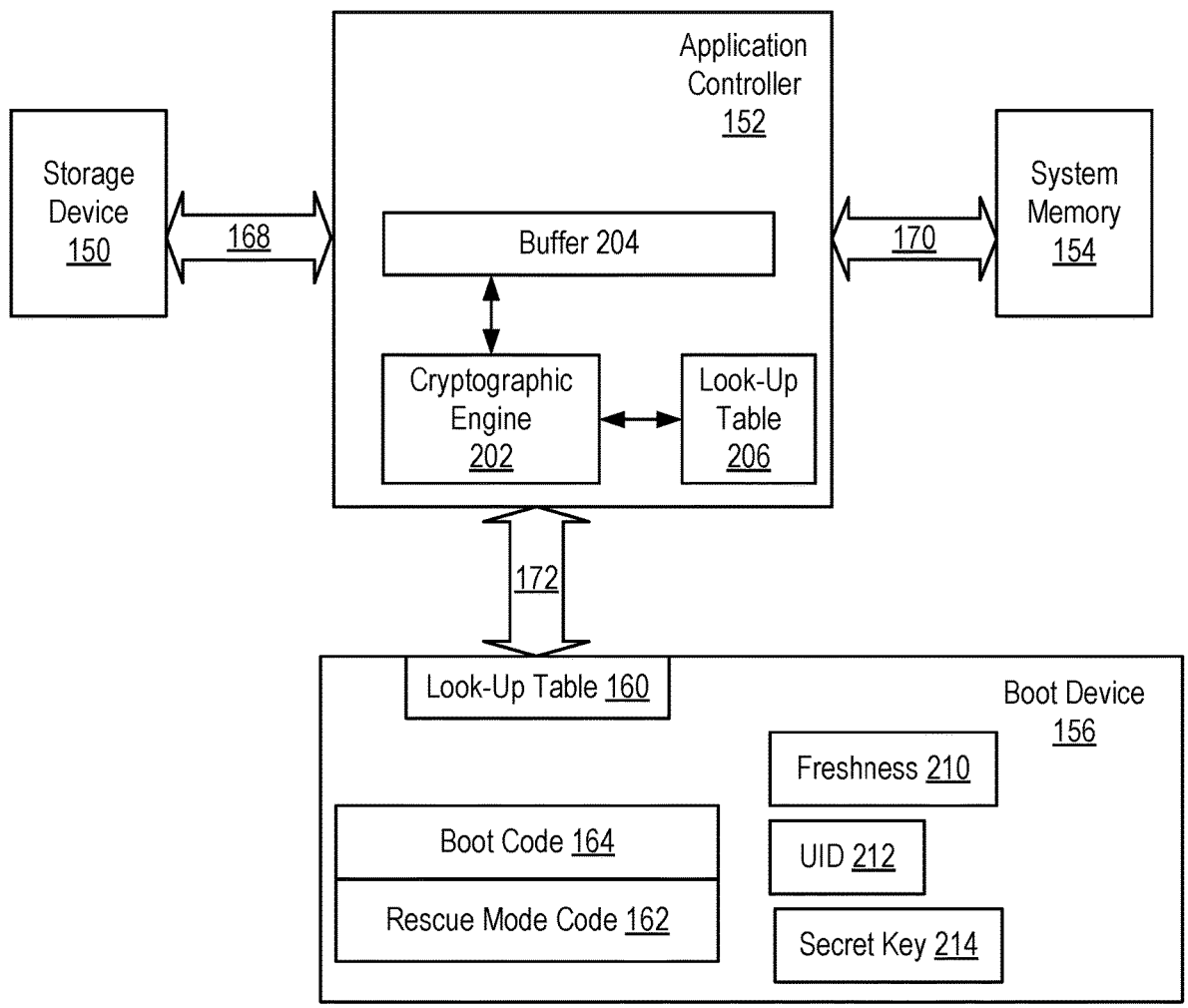
FIG. 2 shows a system for determining whether to accept or reject data (e.g., data stored in a buffer of an application controller) based on comparing a cryptographic measurement of the data to an expected value stored in a look-up table, according to another embodiment.

FIG. 2 shows a system for determining whether to accept or reject data (e.g., a portion of firmware or run-time code stored in a buffer 204 of application controller 152 or boot device 156) based on comparing a cryptographic measurement of the data to an expected value stored in a look-up table, according to another embodiment. The expected values can be, for example, stored in lookup table 160 and/or a lookup table 206 of application controller 152.

In one embodiment, stored data is received by the buffer 204 as a stream of data portions (e.g., a data portion can be one page, as discussed above, or a group of pages). A cryptographic engine 202 calculates a cryptographic measurement for each data portion and compares the measurement to a respective expected value in a lookup table.

In one embodiment, prior to comparing the cryptographic measurements to expected values, the expected values are read from lookup table 160 into memory of application controller 152. In one embodiment, in response to cryptographic engine 202 determining to reject a page of data, application controller 152 discards software previously-stored in system memory 154 from which the rejected page of data was initially obtained. In response to determining to reject the page of data, cryptographic engine 202 can cause application controller 152 to enter or remain in a rescue mode.

In one embodiment, boot device 156 includes a freshness 210, a unique identifier (UID) 212, and a secret key 214 (e.g., stored on-board the boot device 156 in memory). In this embodiment, the application controller 152, before reading and/or using data from boot device 156, verifies the identity of boot device 156 (e.g., to avoid a need for replacement of a boot device component). In this embodiment, the identity verification is based on the UID 212 stored in the boot device 156. In one example, the UID 212 is provided by the boot device 156 at the request of the application controller 152. The UID 212 is provided together with a signature calculated by the boot device 156 using the secret key 214. For example, this calculation may be done as follows: Signature=(Secret Key, UID|Freshness), where Freshness is a field used for anti-replay (e.g., the Freshness can be a monotonic counter, a time stamp, a NONCE, etc.). In this example, the identity is included in the data read by application controller 152 from the boot device 156, and the identity is verified using the following relationship: Identity proof=UID|Freshness|Signature, where as mentioned above, Freshness is a field used for anti-replay (e.g., the Freshness can be a monotonic counter, a time stamp, a NONCE, etc.)

In one embodiment, the previously-stored software was obtained by an over-the-air update requested by application controller 152. In response to discarding the previously store software, application controller 152 makes a request for a new secure over-the-air update (e.g., from the same or a different source).

In one embodiment, the over-the-air update is received from a computing device such as a server. When the application controller 152 is in a rescue mode, the application controller 152 may load rescue mode code 162 from boot device 156, and use at least a portion of rescue mode code 162 to obtain from the server a new update of the software that was previously rejected.

In one embodiment, the data received by buffer 204 is code obtained from storage device 150. In response to determining to accept the data, application controller 152 copies the data from buffer 204 to system memory 154.

In another embodiment, the data received by buffer 204 is a portion of run-time code stored in system memory 154. In response to determining to accept all portions of data of the run-time code, the run-time code is executed by application controller 152.

In one embodiment, the memory used on boot device 156, storage device 150, and/or system memory 154 can be a non-volatile storage media (e.g., flash memory) and/or volatile memory. This memory may, for example, store the lookup table, boot code, and/or rescue code.

FIG. 3 shows an exemplary lookup table (e.g., look-up table 160 or 206) containing a plurality of digests, each digest corresponding to a starting and ending address, according to one embodiment. Lookup table 160 can store a digest that corresponds to each of several portions of data to be checked. Each digest corresponds to a starting and ending address associated with the data to be checked. For example, the starting and ending address may correspond to addresses at which the data is stored in system memory 154. In other examples, the starting and ending addresses correspond to storage locations in memory space of storage device 150 or memory space of another device.

In one embodiment, the lookup table contains the starting address, the ending address, and the digests for different portions of data stored inside system memory 154. In some cases, the data portions can be fragmented in different areas of the memory, each having a different digest. In other cases, the starting and ending addresses can overlap one another. In other words, the different regions of the data portions stored in memory can be overlapped.

In one embodiment, during the boot process, an application controller 152 loads the digests associated with the different data portions in the storage device 150 and/or system memory 154. After loading the digests, various segments of memory correspond to data portions and can be considered to operate as a lookup table containing the data portion and a corresponding digest. For example, during boot of an application by application controller 152, the boot code, the operating system (OS) and software code/applications will be moved (in a compressed manner) from the storage device 150 to the system memory 154. Then, this data is uncompressed and execution by application controller 152 begins. In this example, the digests associated with each segment of the uncompressed data are also loaded. Here, the digests are associated with the data by address range. So, when the system is up after the boot, the system memory (e.g., the volatile memory) contains, for example, the entire operating system, all of the software code/applications, and the table that associates each segment of this loaded data with its corresponding digest.

In one embodiment, the boot device 156 has a hardware security module capability and implements the following features: an authenticated command set, protection against replay attacks; a secret key stored inside memory of the boot device 156 (e.g., the secret key is shared with the system developer, which is a source); a cryptographic engine with a built-in, key-based MAC calculator; and a local buffer that can be used for program operations.

In one embodiment, application controller 152 accesses the boot device 156 when performing some or all of its operations. This access involves using the secret keys, algorithms, and authenticated command set above. The command set is protected against replay attack. Application controller 152 may certify the authenticity of data stored in system RAM and/or in storage device 150, and also may certify the authenticity of secure over-the-air updates such as for firmware updates or boot device updates (security firmware and digests).

In one example, the authenticated command set is a set of commands accepted by (or stored in) memory to execute a function (e.g., read/write/erase). The command set is authenticated if there is a mechanism that signs the command and the arguments; in this manner the command is executed if the signature is recognized to belong to an authority (e.g., a known good source).

Various embodiments regarding resident boot code checks are now discussed below. In one embodiment, at power on of a system, application controller 152 receives secure code from memory that is to be executed. Boot device 156 at the factory level contains boot code 164 to start an application of application controller 152, a local buffer to copy and measure data portions coming from storage device 150, and rescue firmware contained in a resilience block inside memory space of the boot device 156. In one example, rescue mode code 162 is stored in the resilience block. In one example, a resilience block is a special area of memory outside of the addressable space in normal mode of operation. The resilience block can be located inside boot device 156, or can be located in another device.

In one embodiment, application controller 152 moves software from storage device 150 to system memory 154. This is done by first moving content from storage device 150 to local buffer 158 of boot device 156. The boot device performs the cryptographic measurement, and if the measurement matches an expected value, the content is copied to system memory 154.

This procedure continues for each of several data portions of the content until a last data portion of the content is moved inside system memory 154. In one example, if one or more of the data portions is found to be not authentic, the entire content of the system memory is discarded. Application controller 152 loads rescue mode code 162 from boot device 156 and runs a safety firmware with basic functionalities. In one example, these functionalities include requesting a new certified update from another source.

In another embodiment, at power on of a system, application controller 152 receives secure code stored in storage device 150 that is to be executed. The secure code is certified as being authentic prior to executing further operations by application controller 152. Boot code 164 is used to start an application of application controller 152. Boot code 164 also controls determining cryptographic measurements of portions of the secure code received in local buffer 158. In one example, cryptographic engine 166 executes at least a portion of boot code 164. In one example, the cryptographic measurement is a digest calculated by a MAC algorithm that is applied to a stream of received data portions and combined with a secret key stored in memory of boot device 156. In another embodiment, application controller 152 compares the cryptographic measurement with an expected value stored in a lookup table of boot device 156.

As the data portions are checked, each portion is copied to system memory 154 if the respective portion is accepted. If any portion is rejected, then all of the portions corresponding to, for example, a particular computer program or other executable code are discarded. In one embodiment, if a data portion is found to be not authentic, then the entire contents (or other defined or predetermined portion) of system memory 154 is discarded and/or application controller 152 enters a rescue mode, for example as discussed above.

Various embodiments regarding run-time code checks are now discussed below. In one embodiment, during run-time, code is stored in system memory 154. Application controller 152 determines a cryptographic measurement of content in system memory 154 before using particular code. This determination can be done, for example, at regular predetermined intervals and/or just prior to using critical code. This approach is to assure that a malicious event has not changed run-time code inside system memory 154.

Application controller 152 starts a security check by receiving a page of data from system memory 154 to boot device 156. The page in local buffer 158 is internally measured using cryptographic engine 166 to determine a cryptographic measurement, which is compared with an expected value stored in a lookup table to verify authenticity of the page. If the comparison fails, the entire system memory 154 is updated. For example, this update can be performed by a secure over-the-air update. If the page and subsequent pages corresponding to the code are accepted, then the code can be executed by application controller 152.

In another embodiment, application controller 152 executes the cryptographic measurement using cryptographic engine 202. The measurement is compared with an expected value stored in a lookup table, for example lookup table 160 or 206.

In another embodiment, boot device 156 uses local buffer 158 and an algorithm stored in boot device 156 to calculate a digest of data and make a comparison to expected value. In this embodiment, application controller 152 checks only the pass/fail of the comparison made inside the boot device.

Various embodiments regarding a secure over-the-air update are now described below. In one embodiment, the update is used for updating code in boot device 156 and/or code in storage device 150. For example, the update may be a real software update. In another example, the update may be performed to repair code from a recognized attack determined by failure of a comparison between a cryptographic measurement and an expected value, as discussed above.

In one embodiment, application controller 152 receives an update from a remote location. This update can be, for example, a storage device content update. A system provider can, for example, use this approach to update an application, such as improving functionalities and/or security. In one embodiment, application controller 152 stores the received update inside system memory 154 and/or stores the signature of the update inside system memory 154.

In one embodiment, software received by an over-the-air update is split into pages, and each page is copied into local buffer 158. The local value of the cryptographic measurement of the page is stored inside a temporary memory location inside the boot device 156. Measurement of the software is fully completed when all pages of the software are loaded and processed inside the boot device 156.

In one embodiment, if the comparison by the boot device is passed, the update is accepted. For example, the update is copied inside the storage device 150 for a system firmware update, or inside boot device 156 for a boot firmware update. A final signature of the software update can be, for example, stored inside boot device 156 for certifying subsequent operations (e.g., operations during boot and/or run-time). If the comparison by the boot device is failed, then the system enters or remains in a rescue mode, for example as discussed above.

In one embodiment, when an update is downloaded by application controller 152, an image is stored first in system memory (e.g., DRAM), and/or from time-to-time stored in storage device 150. The update is signed (by calculating its MAC) and the signature is the mechanism to ensure that the downloaded content inside the memory is authentic. To perform a check of the signature, all of the data is downloaded, the data is measured against the internal application secret key, and then the final signature is compared with the received signature. If the comparison is a success, then the update is determined to be authentic.

In one embodiment, as mentioned above, the cryptographic measurement is a digest determined using an MAC algorithm. The measure of the OTA update implements the MAC, for example, based on a secret key (e.g., HMAC-SHA256), which is known between the system (e.g., boot device) and the authority (e.g., server or other computing device or source) sending the update. For example, the MAC is calculated as follows: Measure=MAC (Secret_Key, pages_content). In one embodiment, the exchange of system messages can be protected against anti-replay attacks, in that case: Measure=MAC (Secret_Key, pages_content|freshness).

Merely as a specific, non-limiting example, consider a Message and its MAC (signature) calculated by using an algorithm based on a secret KEY (e.g., HMAC-SHA256). In this case, the MAC algorithm is based on a secret key. The sender sends the pair of a Message and signature=MAC (KEY, Message). The receiver receives the Message and signature and recalculates locally the signature of Message with the same formula and secret KEY used by the sender. If the local calculated signature is coincident with the received one, the receiver can be sure that the message comes from the authorized sender because the sender the only one that knows the secret key and is able to generate the proper signature.

A hacker might intercept the communication and re-send later the pair (Message, Signature) in order to emulate an authentic transition. But if the information sent contains a freshness, the hacker is not able to perform this attack (replay attack). "Freshness" is, for example, a piece of information that is different at each transition of a system (e.g., a monotonic counter, a time stamp, or a NONCE). The receiver, to avoid a replay attack, checks that the freshness is good (e.g., the value of monotonic counter, time stamp, etc.) and then proceeds with the calculation of the local signature. The freshness is included in the calculation: Measure=MAC (Secret_Key, pages_content|freshness).

Figure 4:
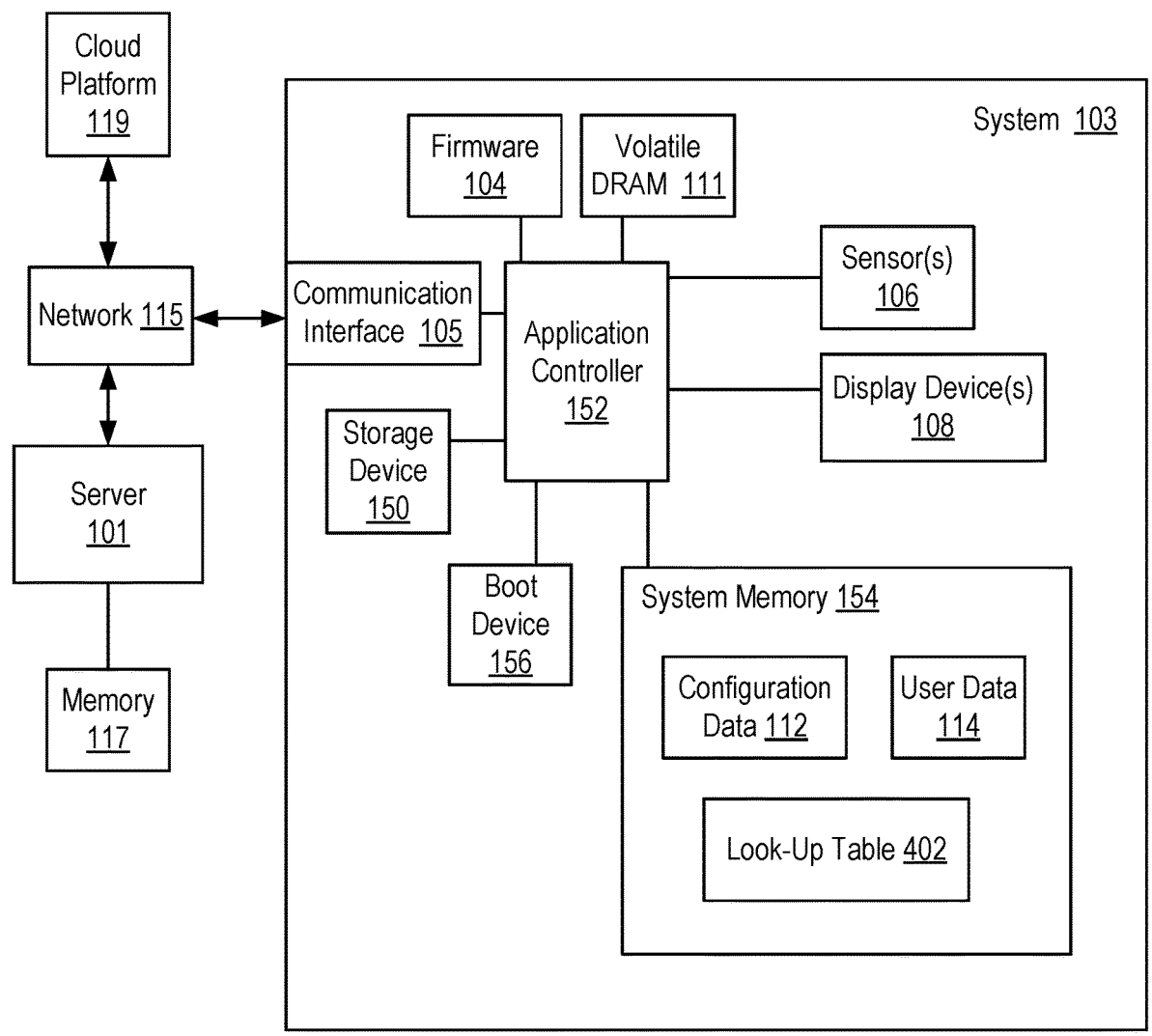
FIG. 4 shows a system for determining authenticity of stored data (e.g., data stored in system memory, data stored in memory of a boot device, or data stored in the storage device), according to one embodiment.

FIG. 4 shows a system 103 for determining authenticity and/or integrity of stored data (e.g., data stored in system memory 154, data stored in memory of boot device 156, or data stored in storage device 150), according to one embodiment. Communication amongst two or more of the system 103, a server 101, and a cloud platform 119 can be performed over a network 115 (e.g., Internet and/or wireless or other network). This communication is performed using communication interface 105.

For example, in some cases system 103 may be a system application board (SAB). In this example, the application controller itself can be a system-on-chip (SOC). In other cases, for example, system 103 itself may be a system-on-chip (SOC). In these other cases, system 103 may be, for example, a monolithic package containing application controller 152.

In one embodiment, the server 101 sends a communication requesting a function or action to be performed by the system 103. The system memory 154 of the system 103 may also store user data 114 for a user of the system 103 or an application or device controlled by the system 103.

In one embodiment, lookup table 402 of system memory 154 stores expected values for comparison to calculated cryptographic measurements. Expected values can be, for example, loaded into lookup table 402 during the boot process, or at any time during normal operation of application controller 152.

In one embodiment, the server 101 controls the loading of user data of a user into the system memory 154 of the system 103. In one embodiment, prior to generating the authorization for usage of the system 103, user data of the new user has been stored on memory 117 at the server 101 (e.g., this user data is associated with prior usage history of a user). After generating the authorization for usage of the system 103, the server 101 sends this stored new user data to the system 103 for loading into memory of the system 103.

In one embodiment, data associated with usage of system 103 is stored in a memory of cloud platform 119. For example, this data may provide authorization credentials or other data that permit a user of cloud platform 119 to access the system 103, such as by opening a door and/or starting the engine of a vehicle.

In one example, the application controller 152 controls one or more operations of a vehicle. For example, the application controller 152 controls the addition or deletion of data from the system memory 154 or other memory. The application controller 152 also controls loading of new data into the system memory 154 and/or other memory of the system 103. The application controller 152 also controls display of information on display device(s) 108. Sensor(s) 106 provide data regarding operation of the system 103. At least a portion of this operational data can be communicated to the server 101 and/or the cloud platform 119.

System memory 154 can further include, for example, configuration data 112. Configuration data 112 can be, for example, data associated with operation of the system 103 as provided by the server 101. The configuration data 112 can be, for example, data that configures operation of the system 103, for example based on conditions associated with a vehicle or IoT device.

In one embodiment, a notification of authorization for usage of system 103 is sent to or received from cloud platform 119. Server 101 also may send a communication to system 103 that includes an authorization.

In one embodiment, the server 101 checks an identity of a user associated with the system 103, and may update user data 114 and/or configuration data 112.

In one embodiment, secure over-the-air updates are provided to system 103 by cloud platform 119 using a wireless communication network 115 (e.g., in response to application controller 152 entering a rescue mode). In this embodiment, communication interface 105 is a wireless interface.

As illustrated in FIG. 4, application controller 152 also may control the display of images on one or more display devices 108. Display device 108 can be a liquid crystal display. The controller 152 may receive data collected by one or more sensors 106. The sensors 106 may be, for example, integrated into the system 103. In another example, the sensors 106 may include, for example, a camera, a microphone, a motion detector, and/or a camera that provides data to the system 103. The sensors 106 also may include, for example, sensors incorporated in wearable devices worn by, or a client device of, the driver and/or passengers in a vehicle that includes the system 103.

In one embodiment, application controller 152 analyzes the collected data from the sensors 106. The analysis of the collected data includes providing some or all of the collected data to server 101 and/or cloud platform 119.

In one embodiment, memory stores data collected by sensors 106 and/or data received by communication interface 105 from a computing device, such as, for example, server 101. For example, this communication may be used to wirelessly transmit collected data from the sensors 106 to the server 101. The data received by the system 103 may include configuration or other data used to configure control of the display devices 108 by application controller 152.

In FIG. 4, firmware 104 controls, for example, the operations of the application controller 152 in determining whether to accept or reject data based on comparing cryptographic measurements to expected values, as described herein. The application controller 152 also can, for example, run the firmware 104 to perform operations responsive to communications from the server 101 and/or cloud platform 119. Firmware in general is a type of computer program that provides control, monitoring and data manipulation of engineered computing devices.

The system 103 includes volatile Dynamic Random-Access Memory (DRAM) 111 for the storage of run-time data and instructions used by the application controller 152 to improve the computation performance of the controller 152 and/or provide buffers for data transferred between the server 101 and memory 109. DRAM 111 is volatile in that it requires power to maintain the data/information stored therein, which data/information is lost immediately or rapidly when the power is interrupted.

Volatile DRAM 111 typically has less latency than non-volatile storage media, but loses its data quickly when power is removed. Thus, it is advantageous to use the volatile DRAM 111 to temporarily store instructions and data used for the controller 152 in its current computing task to improve performance. In some instances, the volatile DRAM 111 is replaced with volatile Static Random-Access Memory (SRAM) that uses less power than DRAM in some applications. When the system memory 154 has data access performance (e.g., in latency, read/write speed) comparable to volatile DRAM 111, the volatile DRAM 111 can be eliminated; and the application controller 152 can perform computing by operating on the system memory 154 for instructions and data instead of operating on the volatile DRAM 111.

In one embodiment, the system memory 154 includes the volatile DRAM 111, and the firmware 104 is loaded into and stored in the volatile DRAM 111. In one embodiment, system memory 154 includes a non-volatile storage media, such as magnetic material coated on rigid disks, and/or memory cells in an integrated circuit. The storage media is non-volatile in that no power is required to maintain the data/information stored in the non-volatile storage media, which data/information can be retrieved after the non-volatile storage media is powered off and then powered on again. In some embodiments, the system memory 154 includes both volatile and non-volatile memory.

In one embodiment, system memory 154 is implemented using various memory/storage technologies, such as NAND gate based flash memory, phase-change memory (PCM), magnetic memory (MRAM), resistive random-access memory, and 3D XPoint, such that the system memory 154 is non-volatile and can retain data stored therein without power for days, months, and/or years.

In one embodiment server 101 communicates with the communication interface 105 via a communication channel having a predetermined protocol.

In one embodiment, the server 101 can be a computer having one or more Central Processing Units (CPUs) to which systems, such as the system 103, may be connected using a computer network. For example, in some implementations, the communication channel between the server 101 and the communication interface 105 includes a computer network, such as a local area network, a wireless local area network, a cellular communications network, or a broadband high-speed always-connected wireless communication connection (e.g., a current or future generation of mobile network link).

In some instances, the application controller 152 has in-processor cache memory with data access performance that is better than the volatile DRAM 111 and/or the system memory 154. In some instances, the application controller 152 has multiple processors, each having its own in-processor cache memory.

In one embodiment, the application controller 152 performs data intensive, in-memory processing using data and/or instructions organized in system memory or otherwise organized in the system 103. For example, the application controller 152 can perform a real-time analysis of a set of data collected and/or stored in the system 103. For example, in some applications, the system 103 is connected to real-time sensors 106 to store sensor inputs; and the processors of the controller 152 are configured to perform machine learning and/or pattern recognition based on the sensor inputs to support an artificial intelligence (AI) system that is implemented at least in part via the system 103, cloud platform 119, and/or the server 101. This analysis of data can be, for example, associated with operation of a vehicle. This analysis can include, for example, analysis of user data 114.

The system 103 can interact with various computing systems, such as a cloud computing system (e.g., cloud platform 119), an edge computing system, a fog computing system, and/or a standalone computer. In a cloud computing system, remote computer servers are connected in a network to store, manage, and process data. An edge computing system optimizes cloud computing by performing data processing at the edge of the computer network that is close to the data source and thus reduces data communications with a centralized server and/or data storage. A fog computing system uses one or more end-user devices or near-user edge devices to store data and thus reduces or eliminates the need to store the data in a centralized data warehouse.

At least some embodiments of the systems and methods disclosed herein can be implemented using computer instructions executed by the application controller 152 (and/or other controllers or devices), such as the firmware 104. In some instances, hardware circuits can be used to implement at least some of the functions of the firmware 104. The firmware 104 can be initially stored in non-volatile storage media, such as by using system memory 154, or another non-volatile device (e.g., a storage device 150 and/or boot device 156), and loaded into the volatile DRAM 111 and/or the in-processor cache memory for execution by the controller 152.

For example, the firmware 104 can be configured to use the techniques discussed herein for checking authenticity and/or integrity of data. However, the techniques discussed herein are not limited to being used in the system 103 of FIG. 4 and/or the examples discussed herein.

Figure 5:
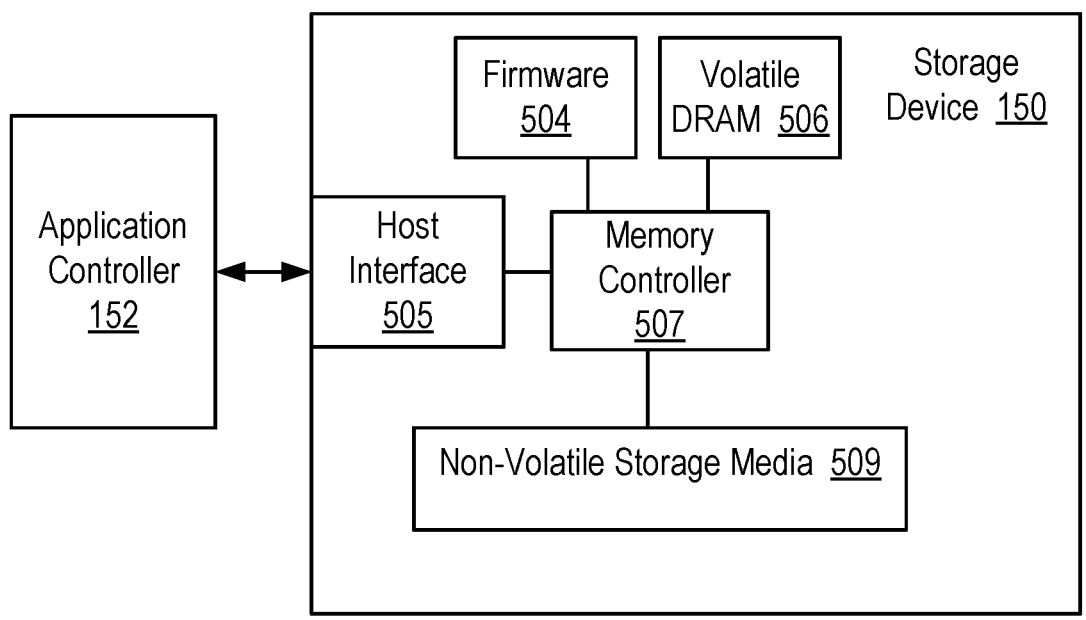
FIG. 5 shows a computer system including a storage device that stores data under the control of an application controller, according to one embodiment.

FIG. 5 shows a computer system including a storage device that stores data under the control of application controller 152, according to one embodiment. The storage device 150 in FIG. 5 includes non-volatile storage media 509, for example having memory of different types. The data stored in storage device 150 can be loaded into, for example, local buffer 158 of boot device 156 for determining cryptographic measurements of the data, as was discussed above.

In FIG. 5, the application controller 152 communicates with the storage device 150 via a communication channel regarding read/write operations using logical addresses. The storage device 150 can be used to store data for the application controller 152 in the non-volatile storage media 509. Examples of computer storage devices in general include hard disk drives (HDDs), solid state drives (SSDs), flash memory, dynamic random-access memory, magnetic tapes, network attached storage device, etc.

The storage device 150 has a host interface 505 that implements communications with the application controller 152 using the communication channel. For example, the communication channel between the application controller 152 and the storage device 150 is a Peripheral Component Interconnect Express (PCI Express or PCIe) bus in one embodiment; and the application controller 152 and the storage device 150 communicate with each other using NVMe protocol (Non-Volatile Memory Host Controller Interface Specification (NVMHCI), also known as NVM Express (NVMe)).

In some implementations, the communication channel between the application controller 152 and the storage device 150 includes a computer network, such as a local area network, a wireless local area network, a wireless personal area network, a cellular communications network, a broadband high-speed always-connected wireless communication connection (e.g., a current or future generation of mobile network link); and the application controller 152 and the storage device 150 can be configured to communicate with each other using data storage management and usage commands similar to those in NVMe protocol.

The storage device 150 has a memory controller 507 that runs firmware 504 to perform operations responsive to the communications from the application controller 152. In various embodiments, firmware is a type of computer program that provides control, monitoring and data manipulation of computing devices. In FIG. 5, the firmware 504 controls the operations of the memory controller 507 in operating the storage device 150.

The storage device 150 has non-volatile storage media 509, such as magnetic material coated on rigid disks, and/or memory cells in an integrated circuit. The storage media 509 is non-volatile in that no power is required to maintain the data/information stored in the non-volatile storage media 509, which data/information can be retrieved after the non-volatile storage media 509 is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media 509 is non-volatile and can retain data stored therein without power for days, months, and/or years.

The storage device 150 includes volatile Dynamic Random-Access Memory (DRAM) 506 for the storage of runtime data and instructions used by the memory controller 507 to improve the computation performance of the memory controller 507 and/or provide buffers for data transferred between the application controller 152 and the non-volatile storage media 509. DRAM 506 is volatile in that it requires power to maintain the data/information stored therein, which data/information is lost immediately or rapidly when the power is interrupted.

Figure 6:
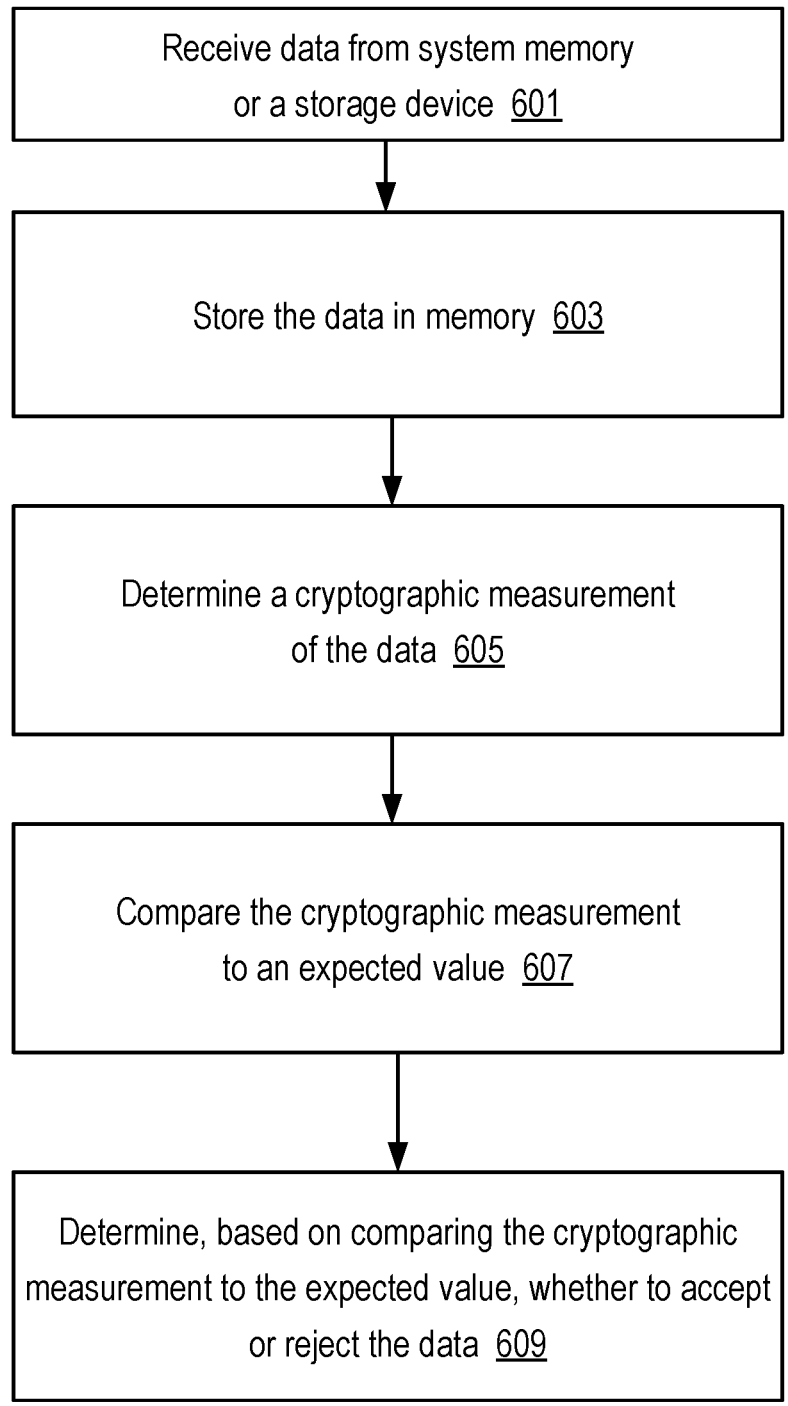
FIG. 6 shows a method to determine whether to accept or reject data based on comparing a cryptographic measurement of the data to an expected value, according to one embodiment.

FIG. 6 shows a method to determine whether to accept or reject data based on comparing a cryptographic measurement of the data to an expected value, according to one embodiment. At block 601, data is received from system memory or a storage device. For example, the method can be implemented for the application controller 152 of FIG. 1 or 2 using the boot device 156.

At block 603, the received data is stored in memory. For example, the data can be stored in local buffer 158 of boot device 156 or buffer 204 of application controller 152.

At block 605, a cryptographic measurement is determined for the received data stored in the memory. The cryptographic measurement can be, for example, a digest calculated using a message authentication code (MAC).

At block 607, the cryptographic measurement is compared to an expected value. The expected value can be, for example, a stored data value. This value can be stored, for example, in a lookup table or other form of stored data.

At block 609, a determination is made whether to accept or reject the received data. This determination is based on comparing the cryptographic measurement to the expected value. Blocks 607 and/or 609 can be performed, for example, by cryptographic engine 166 or 202.

Various additional embodiments are now described below. In one embodiment, a method is implemented by a boot device, and the method includes: receiving, by the boot device, data from a storage device or system memory, wherein the data is read from the storage device or system memory by an application controller; storing the data in a buffer of the boot device; determining, by a processor of the boot device, a cryptographic measurement of the data; comparing, by the processor, the cryptographic measurement to an expected value stored in a look-up table; and determining, based on comparing the cryptographic measurement to the expected value, whether to accept or reject the data.

In one embodiment, the data is received from the storage device, and the method further includes, in response to determining to accept the data, causing the application controller to write the data to the system memory.

In one embodiment, the look-up table is stored in memory of the boot device, in memory of the application controller, or in the system memory.

In one embodiment, determining the cryptographic measurement comprises calculating a digest using a message authentication code, wherein the data and a secret key are inputs for calculating the digest.

In one embodiment, the secret key is stored in memory of the boot device.

In one embodiment, the expected value is a digest stored in the look-up table.

In one embodiment, the digest stored in the look-up table is a first digest, and the look-up table comprises a plurality of digests, each digest corresponding to a respective starting address and a respective ending address.

In one embodiment, the respective starting address and the respective ending address identify addresses in a memory space of the storage device or the system memory.

In one embodiment, the data is received from the storage device, a computer program is stored in the storage device, the computer program comprises a plurality of data portions, the data received from the storage device is a first data portion of the plurality of data portions, and the computer program is executed by the application controller after each of the plurality of data portions is accepted, based on a cryptographic measurement using the respective data portion as an input, and written to the system memory.

In one embodiment, the data is received from the storage device, and boot code is stored in memory of the boot device, the method further comprising, prior to receiving the data from the storage device, loading the boot code to the application controller for starting an application of the application controller.

In one embodiment, a system includes: at least one processor; and memory containing instructions configured to instruct the at least one processor to: receive data from a system memory or a storage device; store the data in a first memory; determine a cryptographic measurement of the data; compare the cryptographic measurement to an expected value; and determine, based on comparing the cryptographic measurement to the expected value, whether to accept or reject the data.

In one embodiment, the first memory is a buffer of a boot device, the data is received, via an application controller, by the buffer from the system memory, and the instructions are further configured to instruct the at least one processor to, in response to determining to reject the data, update at least a portion of data in the system memory.

In one embodiment, the data is received from the system memory, the first memory is memory of an application controller, and a computer program including the data is stored in the system memory, and wherein the instructions are further configured to instruct the at least one processor to, in response to determining to accept the data, execute the computer program.

Figure 7:
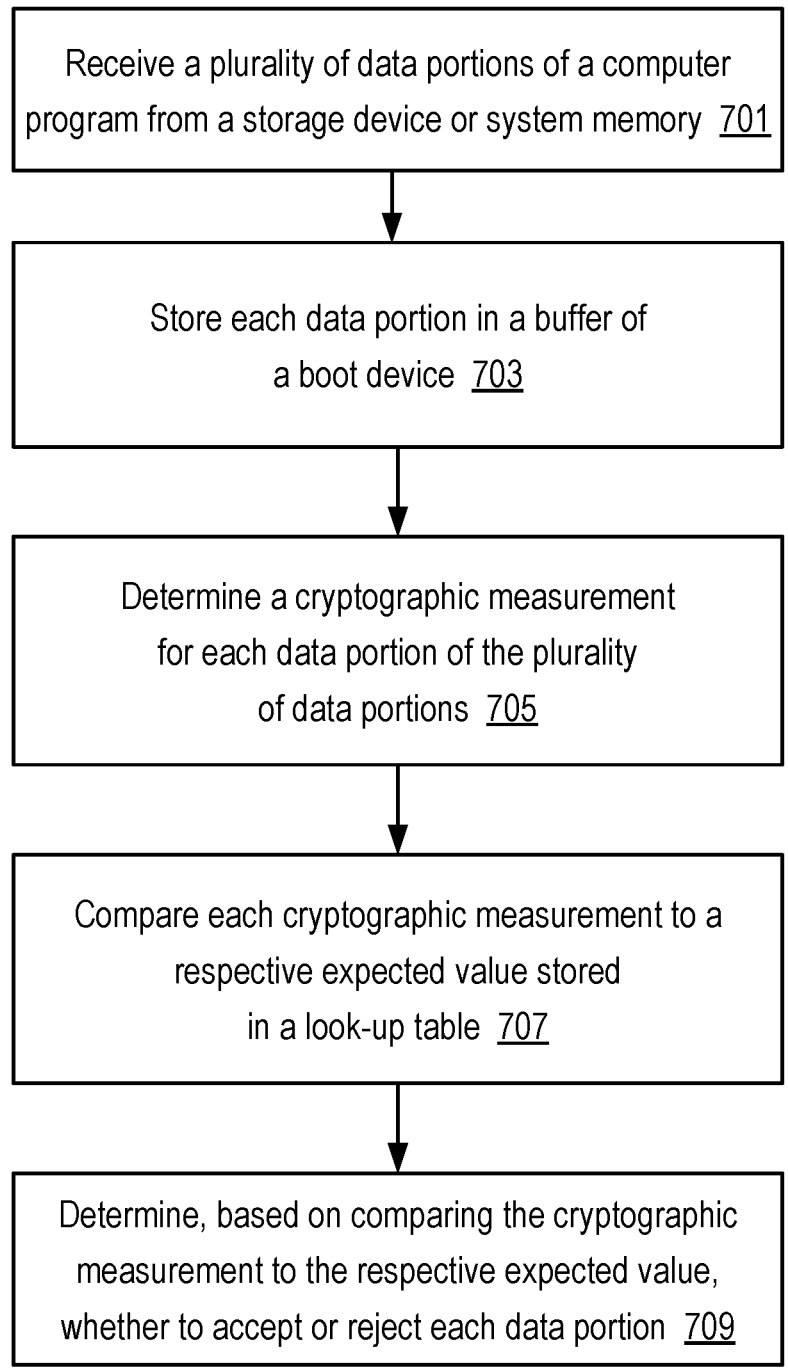
FIG. 7 shows a method to receive data portions of a computer program stored in a storage device or system memory, and to determine whether to accept or reject each data portion based on comparing a cryptographic measurement of the data portion to a respective expected value, according to one embodiment.

FIG. 7 shows a method to receive data portions of a computer program stored in a storage device or system memory, and to determine whether to accept or reject each data portion based on comparing a cryptographic measurement of the data portion to a respective expected value, according to one embodiment. At block 701, a plurality of data portions of the computer program are received from a storage device or system memory. For example, the plurality of data portions may be pages of code in firmware or run-time code, as was described above. For example, the method can be implemented for the application controller 152 of FIG. 1 or 2 using boot device 156.

At block 703, each received data portion is stored in a buffer of a boot device. For example, the buffer is local buffer 158 and boot device is boot device 156.

At block 705, a cryptographic measurement is determined for each data portion of the received data portions. The cryptographic measurement is, for example, a digest calculated using a MAC.

At block 707, each cryptographic measurement is compared to a respective expected value stored in a lookup table. For example, the lookup table is lookup table 160 and/or 206.

At block 709, a determination is made whether to accept or reject each data portion. The determination is based on comparing the cryptographic measurement to the respective expected value. In one embodiment, in response to accepting all data portions of code content, the application controller 152 executes the code content.

Various additional embodiments are now described below. In one embodiment, a method includes: receiving, by at least one processor, data from a computing device; storing the data in memory; determining, by the at least one processor, a cryptographic measurement of the data; comparing, by the at least one processor, the cryptographic measurement to an expected value, wherein the expected value is stored in memory; and determining, based on comparing the cryptographic measurement to the expected value, whether to accept or reject the data.

In one embodiment, the computing device is a storage device, and storing the data in memory comprises storing the data in a buffer of a boot device, the method further comprising, in response to determining to accept the data, copying the data from the buffer to a system memory.

In one embodiment, the method further includes, in response to determining to reject the data, causing an application controller to enter or remain in a rescue mode.

In one embodiment, the data is a first update, and receiving the data from the computing device comprises receiving an over-the-air update of software that includes the first update, and wherein the rescue mode comprises causing the application controller to load rescue mode code from the boot device, and to execute the rescue mode code to obtain a second update of the software from the computing device.

In one embodiment, the computing device is a storage device, and the cryptographic measurement is determined by a cryptographic engine of an application controller, and the method further includes: prior to comparing the cryptographic measurement to the expected value, causing the application controller to read the expected value from a look-up table of a boot device, and to store the expected value in memory of the application controller.

In one embodiment, comparing the cryptographic measurement to the expected value is performed by the application controller, and the method further includes, in response to determining to reject the data, causing the application controller to discard software previously-stored in a system memory of the application controller, wherein the software includes the rejected data.

In one embodiment, the previously-stored software was obtained from the computing device by an over-the-air update requested by the application controller.

In various embodiments, a non-transitory computer storage medium is used to store instructions of the firmware 104 of system 103, and/or firmware of other components (e.g., application controller 152, a storage device 150, or boot device 156). When the instructions are executed by a controller (e.g., an application controller, or a controller of a boot or storage device), the instructions cause the controller to perform any of the methods discussed herein.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully-functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
   at least one processor; and
   memory containing instructions configured to instruct the at least one processor to
   receive data from a source; and
   a boot device configured to:
   determine a cryptographic measurement of the data;
   compare the cryptographic measurement to an expected value stored in a look-up table;
   determine, based on comparing the cryptographic measurement to the expected value, whether to accept or reject the data; and
   perform, in response to a determination to reject the data, an over-the-air update of the data to be used by the processor.

2. The system of claim 1, wherein the data is software; and wherein the instructions are further configured to instruct the at least one processor to, in response to determining to accept the data, execute the software.

3. The system of claim 1, wherein the look-up table is stored in memory of an application controller.

4. The system of claim 3, wherein the application controller is configured to control at least one operation of a vehicle, and the data is configuration data that configures the operation of the vehicle.

5. The system of claim 3, wherein:
   the data is first data;
   the expected value is a first expected value;
   the application controller comprises a buffer configured to receive the first data;
   the buffer is further configured to receive second data from a storage device; and
   the instructions are further configured to instruct the at least one processor to:
   determine a cryptographic measurement of the second data;
   compare the cryptographic measurement of the second data to a second expected value stored in the look-up table; and
   determine, based on comparing the cryptographic measurement of the second data to the second expected value, whether to accept or reject the second data.

6. The system of claim 5, wherein the instructions are further configured to instruct the at least one processor to:
   determine, based on comparing the cryptographic measurement of the second data to the second expected value, reject the second data; and
   in response to determining to reject the second data, request the second data from a source other than the storage device.

7. The system of claim 1, wherein the look-up table comprises a starting address and an ending address for each of a plurality of digests, each digest corresponding to a portion of the data.

8. The system of claim 1, wherein:
   the look-up table is stored in a system memory;
   comparing the cryptographic measurement to the expected value comprises reading the expected value from the look-up table; and
   the instructions are further configured to instruct the at least one processor to load the look-up table into the system memory from the boot device during a boot process.

9. A system comprising:
   a boot device having memory and a controller;
   wherein the controller is configured to:
   receive data from a first source;
   store the data in the memory;
   determine a cryptographic measurement of the data using a secret key;
   compare the cryptographic measurement to an expected value stored in the memory, wherein the expected value corresponds to a starting address and an ending address associated with the data;

determine, based on comparing the cryptographic measurement to the expected value, whether to accept or reject the data; and perform, in response to a determination to reject the data, an over-the-air update of the data.

10. The system of claim 9, further comprising:

a system memory used by the controller for storing software executed by the controller;

wherein the controller is further configured to, in response to determining to accept the data, copy the data from a buffer in the boot device to the system memory.

11. The system of claim 10, wherein the boot device stores rescue code, and the controller is further configured to:

in response to determining to reject the data, load the rescue code from the boot device into the system memory; and execute the rescue code.

12. The system of claim 9, wherein the secret key is stored in memory of the boot device.

13. The system of claim 9, wherein the starting address and the ending address for each expected value identify addresses in a memory space of the memory.

14. A method comprising:

reading, by an application controller, data from a storage device;

storing the data in a buffer of the application controller;

determining a cryptographic measurement of the data using a secret key;

comparing the cryptographic measurement to an expected value stored in a look-up table;

determining, based on comparing the cryptographic measurement to the expected value, whether to accept or reject the data; and performing, in response to a determination to reject the data, an over-the-air update of the data to be used by a processor.

15. The method of claim 14, further comprising:

in response to determining to reject the data, loading rescue code from a boot device into system memory of the application controller, and executing the rescue code.

\* \* \* \* \*